Dec. 2, 1930.  E. A. THIEM  1,783,861
ANTIFROST DEVICE
Filed Oct. 10, 1929
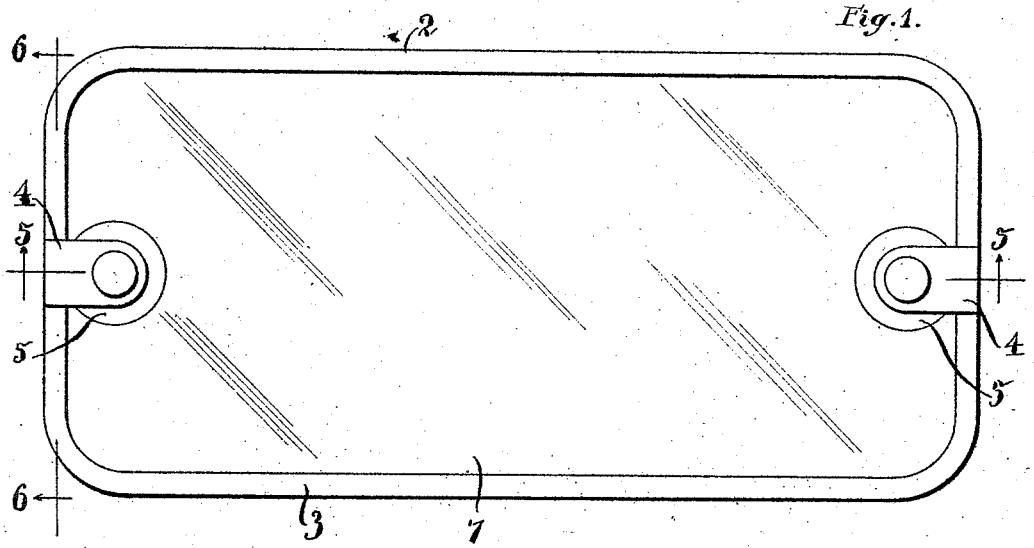
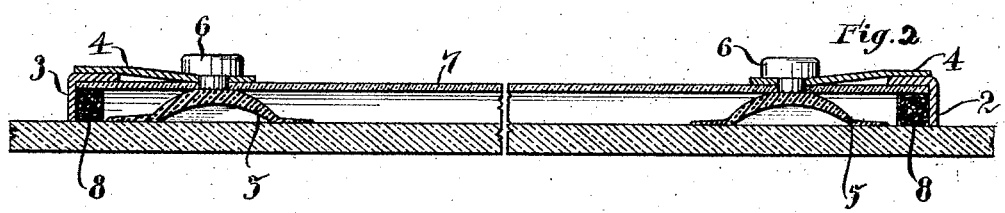
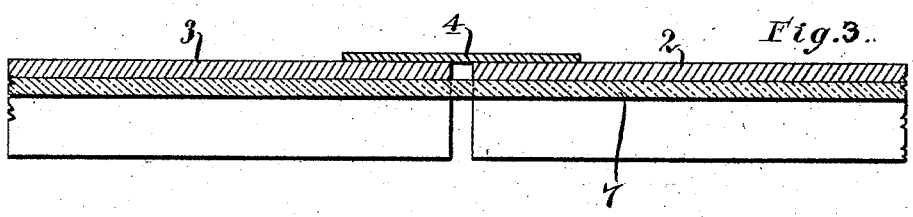
INVENTOR
Edward A. Thiem
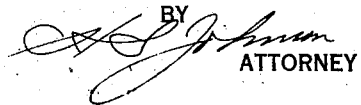
ATTORNEY Patented Dec. 2, 1930

1,783,861

UNITED STATES PATENT OFFICE

EDWARD A. THIEM, OF MINNEAPOLIS, MINNESOTA

ANTIFROST DEVICE

Application filed October 10, 1929. Serial No. 398,651.

The present invention relates to anti-frost devices particularly designed for use in connection with the windshield of an automobile.

An object of my invention is to provide a frame formed of angle iron, within which is suitably secured a transparent sheet and a continuous sealing strip positioned inside the flanged frame and with vacuum cups supported upon the ends of the frame to cause the same to adhere to a pane of glass and with the vacuum cups so supported in an offset relationship to the end of the frame as not to interfere with the sealing strip.

I am aware that it is old, as in the patent to Harry H. Steinman, Number 1,681,443, dated August 21, 1928, to build a frame of this general type, but, in the character of frame shown in that patent in the form of a one-piece angular frame, the frame can only be obtained by cutting and, consequently, wasting material, and it has been my object to secure a frame where a narrow strip of angle iron can be used, and can be bent and attached to the end brackets without cutting, and wherein the frame sides may be bent and joined to the brackets without any bending irregularities to bring about a smooth, bended frame.

To this end, I bend two strips of thin, angular material to form the top and bottom of the frame, so holding the metal in the bending process as to make a particularly smooth bend, permitting an accurate fitting of the transparent sheet within the flange of the frame, and then separately joining the ends of these two sections to the brackets.

These and other features of my invention will be more specifically set forth in the following description and accompanying drawings, wherein:

Figure 1 is a view in top elevation of the finished product.

Figure 2 is a sectional view on line 5—5 of Figure 1; and

Figure 3 is a sectional view on line 6—6 of Figure 1.

Referring to the drawings in detail, Figures 1 to 3 show my improved frame. This frame is formed of two members, 2 and 3, of narrow angle sheet metal each member being curved at its ends to merge into an end portion standing at substantially right angles to the length of the angled strip. The adjacent ends of the two members 2 and 3 are separately connected to bracket portions 4. as by welding. These bracket portions join the bent ends of the adjacent members 2 and 3 to form the ends of the frame.

Vacuum cups 5 are supported in the brackets in a position offset from the frame and are held in position as by thumb screws 6.

I have shown in the drawing the bracket portions extending inwardly from the ends of the frame, as a preferred construction, but, it is apparent, that they might equally extend outwardly from the ends of the frame within the concept of my invention.

Within the frame thus formed by the angle strip, I secure in suitable manner the transparent sheet 7 and a sealing strip 8 extending around the edge of the transparent sheet inside the flange. Whether the bracket portions are offset inwardly from the ends of the frame, or outwardly, it is the intention of my invention that the vacuum cups shall be spaced by the bracket portions from the end of the frame, and the sealing strip, so as not to interfere with the continuity of the sealing strip, thereby securing a completely closed dead-air space behind the transparent sheet when the device is placed in adhering position upon a windshield by means of the vacuum cups, with the sealing strip in contact with the glass.

The separate welding of the members 3 and 4 to the bracket portions, brings about a particularly stiff and strong construction of frame.

I claim:

1. A windshield anti-frost device, consisting of a frame comprising two strips of angular metal with their free ends bent at substantially right angles with the body of the strips, bracket portions separately connected to and supporting adjacent ends of said metal strips to form a frame end, a transparent sheet secured inside the flange of said frame, a sealing strip secured around the edge of the transparent sheet inside the flange of the frame, and vacuum cups supported by said brackets in a position spaced from the ends of the frame and said sealing strip.

2. An anti-frost shield, comprising a frame formed of angular, strip metal bent inwardly at the free ends thereof, and having the free ends thereof in abutting relation, bracket means secured to said free ends to hold said ends in abutting relation, a transparent sheet inserted within said frame, sealing means extending beyond the lower edge of said metal frame, and vacuum cups carried by said brackets to secure the device in position.

3. An anti-frost shield, comprising a frame formed of angular strip metal bent inwardly and having the free ends thereof in abutting relation, bracket means secured over said abutting free ends to conceal said ends, a transparent sheet inserted in said frame, an insulative strip around said frame and extending below the lower edge thereof, and a vacuum cup connected to each of said brackets to support the device.

In testimony whereof I affix my signature.

EDWARD A. THIEM.